(12) United States Patent
Van Wonderen et al.

(10) Patent No.: US 6,659,239 B2
(45) Date of Patent: Dec. 9, 2003

(54) SHOCK ABSORBER THROUGH THE ROD DAMPING ADJUSTMENT

(75) Inventors: Simon Van Wonderen, Toronto (CA); Neil Farr, Ontario (CA); Julian Harbu, North York (CA)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 94 days.

(21) Appl. No.: 09/950,099

(22) Filed: Sep. 10, 2001

(65) Prior Publication Data

US 2003/0047396 A1 Mar. 13, 2003

(51) Int. Cl.[7] .................................................. F16F 9/46
(52) U.S. Cl. ............................... 188/282.1; 188/282.7; 188/322.15; 188/322.22; 188/319.1; 188/319.2
(58) Field of Search ....................... 188/322.15, 322.22, 188/299.1, 319.1, 319.2, 266.1–266.6, 269, 282.7, 281, 280, 322.13, 318, 297, 316, 317, 285, 282.1–282.9; 267/64.15; 280/6.159, 124.159

(56) References Cited

U.S. PATENT DOCUMENTS

| | | | | |
|---|---|---|---|---|
| 2,592,656 A | * | 4/1952 | Catranis | |
| 2,825,427 A | * | 3/1958 | Steibel | |
| 3,003,595 A | * | 10/1961 | Patriquin | |
| 3,848,710 A | * | 11/1974 | Thompson et al. | |
| 4,305,486 A | * | 12/1981 | Cowan | |
| 4,337,850 A | * | 7/1982 | Shimokura | |
| 4,593,921 A | | 6/1986 | Marier | |
| 4,596,320 A | * | 6/1986 | Shimokura et al. | |
| 4,826,260 A | | 5/1989 | Plourde | |
| 4,874,066 A | * | 10/1989 | Silberstein | |
| 4,958,706 A | | 9/1990 | Richardson et al. | |
| 5,078,240 A | | 1/1992 | Ackermann et al. | |
| 5,085,299 A | * | 2/1992 | Spiess et al. | |
| 5,094,325 A | * | 3/1992 | Smith | |
| 5,207,300 A | * | 5/1993 | Engel et al. | |
| 5,370,198 A | | 12/1994 | Karpik | |
| 5,667,031 A | | 9/1997 | Karpik | |
| 5,881,834 A | | 3/1999 | Karpik | |
| 5,988,330 A | * | 11/1999 | Morris | |
| 6,044,940 A | * | 4/2000 | Marzocchi et al. | 188/299.1 |
| 6,279,703 B1 | * | 8/2001 | Mete | 188/319.1 |
| 6,360,857 B1 | * | 3/2002 | Fox et al. | 188/319.1 |

FOREIGN PATENT DOCUMENTS

| | | | |
|---|---|---|---|
| DE | 3421601 | * | 12/1985 |
| DE | 3924166 | * | 2/1991 |
| DE | 4103356 | * | 6/1992 |
| EP | 0173020 | * | 3/1986 |
| GB | 2123922 | * | 2/1984 |

* cited by examiner

Primary Examiner—Douglas C. Butler
(74) Attorney, Agent, or Firm—Carlson, Gaskey & Olds

(57) ABSTRACT

A shock absorber is provided that includes a shock absorber body defining a cavity that is at least partially filled with hydraulic fluid. A piston is slidably arranged within the body and separates the cavity into rebound and compression fluid chambers. A rod is secured to the piston and includes first and second portions that are respectively adjacent to the rebound and compression chambers. A fluid passageway extends between the first and second portions to fluidly connect the rebound and compression chambers. In this manner, fluid is permitted to flow through the rod to provide damping characteristics in addition to those damping characteristics typically provided by the piston. A valve assembly, which may include a one-way check valve, is arranged within the passageway for controlling the flow of fluid between the rebound and compression chambers through the passageway. Preferably, the rod includes a longitudinal bore having an adjustable plunger arranged therein. The plunger may be adjusted by a knob to move the plunger to block at least a portion of the passageway to further control the flow of hydraulic fluid through the passageway.

8 Claims, 2 Drawing Sheets

US 6,659,239 B2

SHOCK ABSORBER THROUGH THE ROD DAMPING ADJUSTMENT

BACKGROUND OF THE INVENTION

This invention relates to a shock absorber, and more particularly, the invention relates to a shock absorber having a fluid passageway in the piston rod for damping adjustment.

Shock absorbers are used in vehicles to dampen inputs from roadways. For some vehicle applications, such as snowmobiles, it may be highly desirable to provide the operator the ability to externally adjust damping characteristics of the shock absorber. To this end, some shock absorbers have incorporated a fluid passageway in the shock absorber piston rod to fluidly connect the rebound and compression fluid chambers. The rod has included a longitudinal bore with a plunger arranged within the bore. An adjustment knob, which is accessible to the vehicle operator from the exterior of the shock absorber, cooperates with the plunger to move the plunger between various positions to control the flow of fluid through the passageway. In this manner, damping characteristics may be adjusted by the operator.

Adjusting the plunger in the manner described above has affected the damping characteristics for both the rebound and compression strokes of the shock absorber. However, for a particular application it may be desirable to provide adjustment of the plunger that affects the damping characteristics for only one of the compression or rebound strokes. Therefore, what is needed is through the rod damping adjustment that affects the damping characteristics for one of the rebound or compression strokes.

SUMMARY OF THE INVENTION AND ADVANTAGES

The present invention provides a shock absorber including a shock absorber body defining a cavity that is at least partially filled with hydraulic fluid. A piston is slidably arranged within the body and separates the cavity into rebound and compression fluid chambers. A rod is secured to the piston and includes first and second portions that are respectively adjacent to the rebound and compression chambers. A fluid passageway extends between the first and second portions to fluidly connect the rebound and compression chambers. In this manner, fluid is permitted to flow through the rod to provide damping characteristics in addition to those damping characteristics typically provided by the piston. A valve assembly, which may include a one-way check valve, is arranged within the passageway for controlling the flow of fluid between the rebound and compression chambers through the passageway. Preferably, the rod includes a longitudinal bore having an adjustable plunger arranged therein. The plunger may be adjusted by a knob to move the plunger to block at least a portion of the passageway to further control the flow of hydraulic fluid through the passageway.

Accordingly, the above invention provides through the rod damping adjustment that affects the damping characteristics for one of the rebound or compression strokes.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
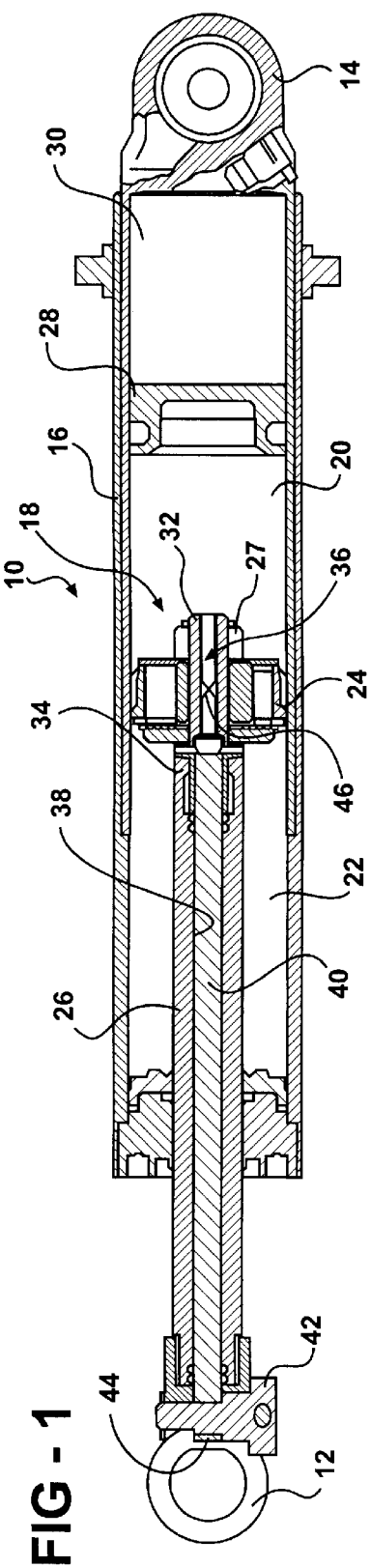
FIG. 1 is a cross-sectional view of a monotube shock absorber.

A monotube shock absorber 10 is shown in FIG. 1, although the present invention may also be used with twin tube shock absorbers. The shock absorber 10 is connected between a suspension and a vehicle body by upper 12 and lower 14 ends. The absorber 10 includes a body 16 defining a cavity 18 that is filled with hydraulic fluid. A piston 24 is disposed within the cavity 18 and separates compression 20 and rebound 22 fluid chambers from one another. A rod 26 is secured to the piston 24 typically by a nut 27 to transmit the input received from the upper end 12 to the piston 24 to move the piston 24 within the cavity 18. A floating piston 28 is arranged in the cavity 18 to separate the compression chamber 20 from a gas chamber 30. As is known in the art, the floating piston 28 moves within the cavity 18 to accommodate the additional volume of the rod 26 during the compression and rebound strokes.

The piston 24 typically includes numerous valves and passages that controls the flow of fluid between the compression 20 and rebound 22 chambers to define the damping characteristics of the absorber 10 as the piston 24 moves longitudinally in the cavity 18. For some shock absorber applications, such as for snowmobiles, it may be desirable to provide an adjustment assembly to permit the operator to adjust damping characteristics of the absorber 10. To this end, the rod 26 has included a bore 38 with a plunger 40 movable within the bore. A passageway 36 extends from a first portion 32 adjacent to the compression chamber 20 to a second portion 34 that is adjacent to the rebound chamber 22. Hydraulic fluid is permitted to flow between the compression 20 and rebound 22 chambers through the passageway 36. One end of the plunger 40 cooperates with an adjustment knob 42 mounted on the absorber 10, which is accessible to the operator. The adjustment knob 42 includes a cammed surface 44 that coacts with the end of the plunger 40 to move the plunger within the bore 38. The plunger 40 is moved within the bore 38 to manipulate an end of the plunger 40 opposite the adjustment knob 42 within the passageway 36. That is, the plunger 40 is manipulated to increase or decrease the flow of hydraulic fluid through the passageway 36 to adjust the damping characteristics provided by fluid flow through the passageway 36.

It may be appreciated from the arrangement shown in FIG. 1 that in the prior art, adjustment of the plunger 40 adjusts the damping characteristics of the absorber 10 during both the compression and rebound strokes. That is, the damping characteristics of the absorber 10 during the rebound and compression strokes may not be adjusted independently. To this end, the present invention incorporates a valve assembly 46 arranged within the passageway 36 to permit adjustments of the damping characteristics during either the compression or rebound strokes depending upon the particular application. For example, it may be desirable to provide adjustment of the absorber for the compression stroke only to accommodate a different number of passengers or passenger weights on the snowmobile.

Figure 2B:
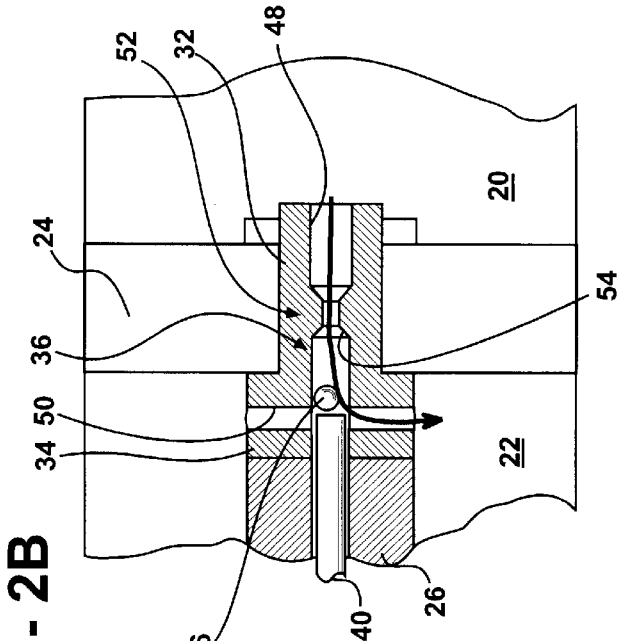
FIG. 2B is the valve assembly shown in FIG. 2A in an open position.
Figure 2A:
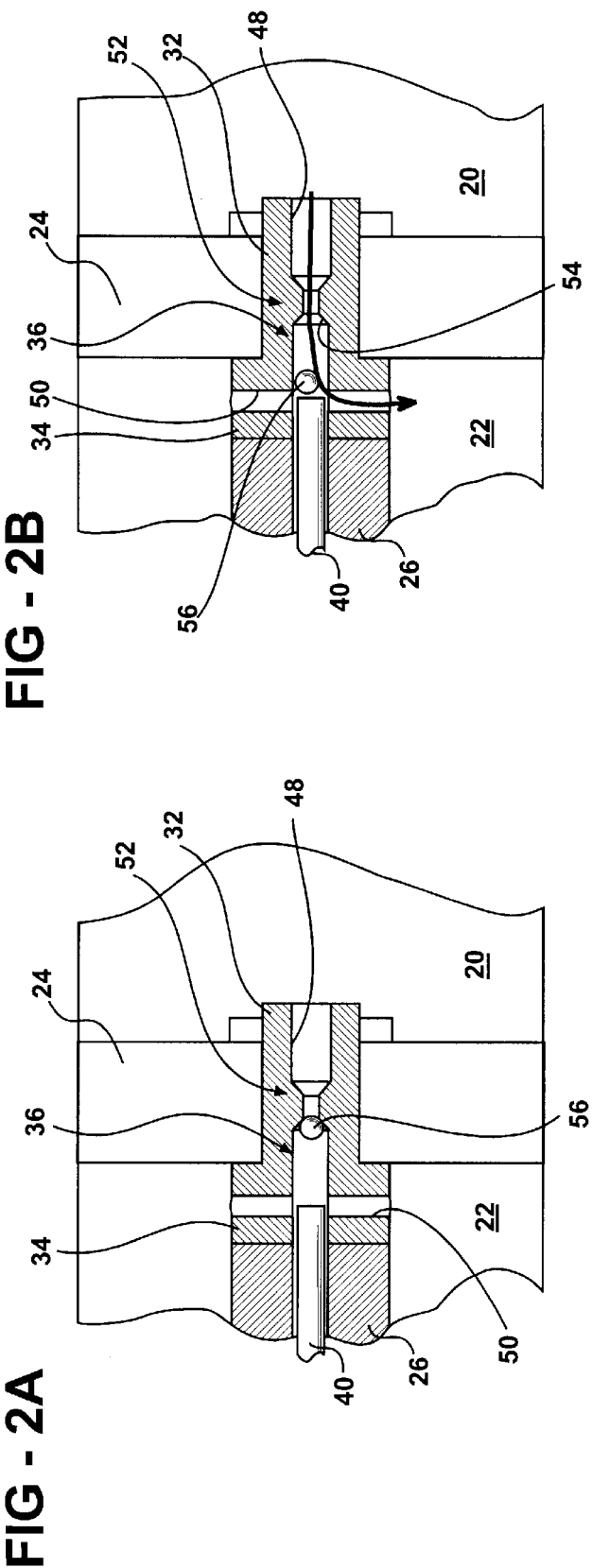
FIG. 2A is an enlarged cross-sectional view of a shock absorber rod with a first embodiment of the present invention valve assembly in a closed position.

Referring to FIGS. 1 and 2A, the passageway 36 may include a first passage 48 extending longitudinally from the first portion 32 in the direction of the plunger 40. The passageway 36 also includes a second passage 50 extending from the second portion 34 transverse to the first passage 48 such that the first 48 and second 50 passages meet at an intersection. The end of the plunger 40 is arranged within the passageway 36 at the intersection to adjust the flow therethrough as described above.

Figure 2C:
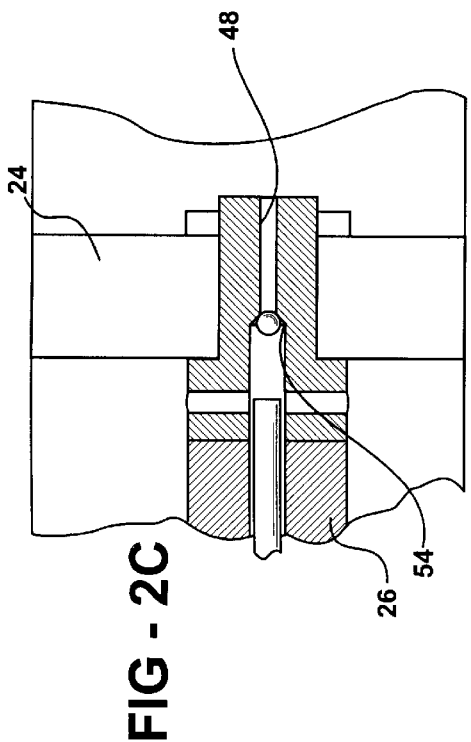
FIG. 2C is an alternative feature of the rod shown in FIG. 2A.

FIGS. 2A and 2B depicts an arrangement in which adjustment of the plunger 40 affects the damping characteristics of the absorber 10 during the compression stroke only. The valve assembly 46 may include a one-way check valve 52 arranged within the passageway 36 to prevent flow to the passageway 36 during the rebound stroke, as illustrated in FIG. 2A. Conversely, the check valve 52 permits flow through the passageway 36 during the compression stroke, as illustrated in FIG. 2B. The check valve 52 may be arranged within the first passage 48. The check valve 52 includes a tapered valve seat 54 and a ball 56 seated against the valve seat 54, as shown in FIG. 2A. During the compression stroke, the increase in fluid pressure in the compression chamber 20 forces the ball 56 from the valve seat 54 to an open position (shown in FIG. 2B) to permit flow of fluid through the passageway 36. The rod end supporting the piston 24 may be alternatively configured as shown in FIG. 2C. Specifically, the first passage 48 may include straight walls suitable for flow during the compression stroke only as opposed to including an additional valve seat so that the rod may also be used for rebound flow configurations (shown in FIGS. 3A and 3B).

Figure 3A:
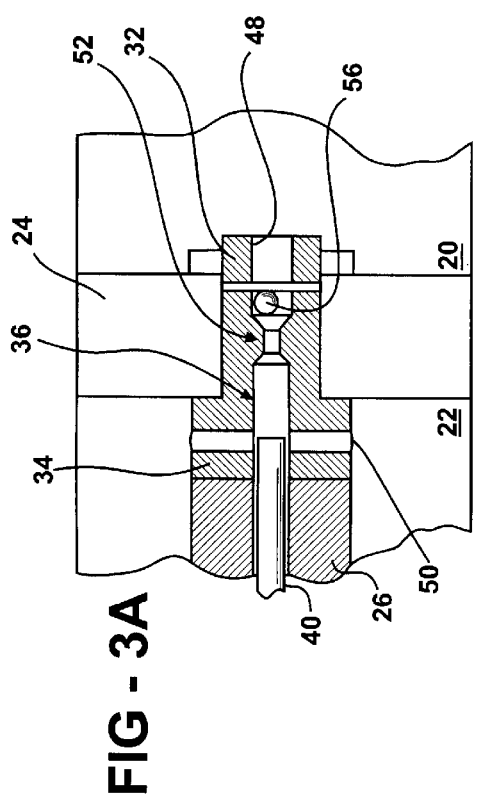
FIG. 3A is an enlarged cross-sectional view of a shock absorber rod with a second embodiment of the present invention valve assembly in a closed position.
Figure 3B:
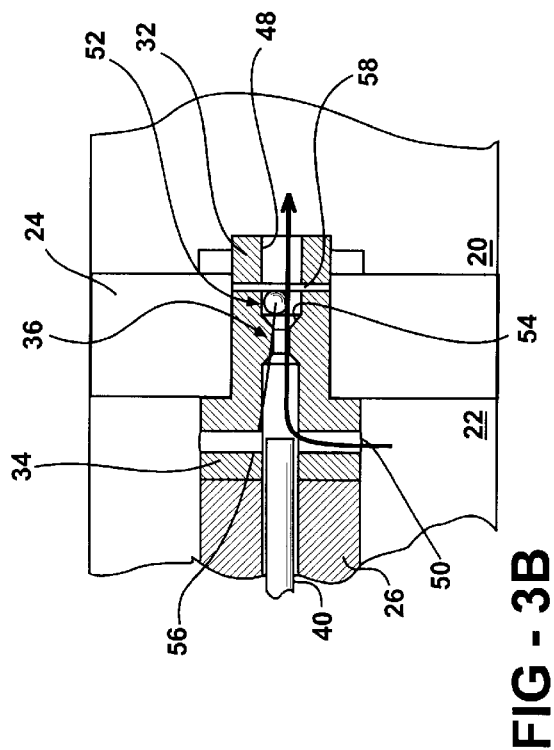
FIG. 3B is the valve assembly shown in FIG. 3A in an open position.

Alternatively, if it is desirable to provide damping adjustment during the rebound stroke, the valve assembly 46 may be arranged as shown in FIGS. 3A and 3B. The one-way check valve 52 is reversed from the orientation shown in FIGS. 2A and 2B such that the ball 56 is seated against the valve seat 54 during the compression stroke, shown in FIG. 3A, so that fluid is prevented from flowing from the compression chamber 20 to the rebound chamber 22. During the rebound stroke the increase in pressure in the rebound chamber 22 forces the ball 56 from the valve seat 54 to permit fluid flow through the passageway 36 from the rebound chamber 22 to the compression chamber 20. The check valve 52 may include a retainer 58 to retain the ball 56 within the passageway 36. In this manner, adjustment of the plunger 40 adjusts the damping characteristics provided by fluid flow through the passageway 36 during only one of either the compression or rebound strokes.

Figure 4:
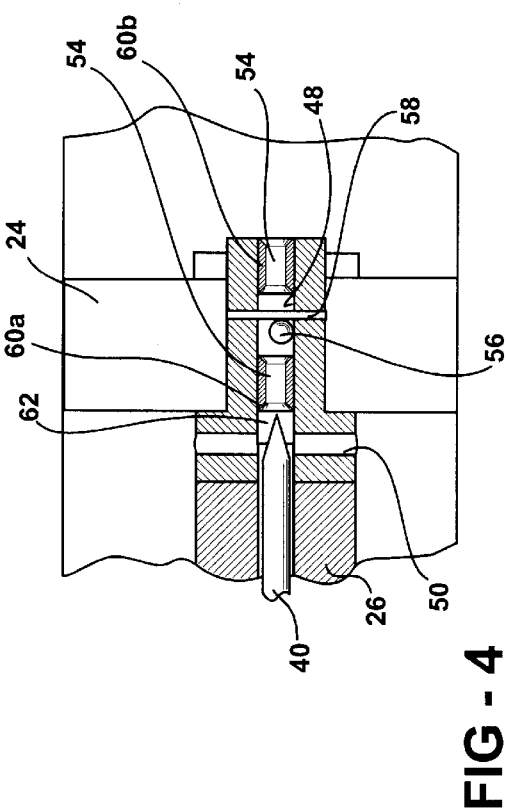
FIG. 4 is an alternative feature of the valve assembly shown in FIG. 3B, but arranged for flow during the rebound stroke.

FIG. 4 depicts an alternative construction for the rod 26. Insert 60a and 60b may be inserted into the first passage 48 to provide the valve seats 54 thereby eliminating difficulty in machining the valve seats in the rod 26. Although an arrangement for flow during a rebound stroke is shown, the arrangement may be used for flow during a compression stroke. That is, the ball 56 may be arranged on the other side of the retainer 58 for use during the compression stroke to provide flow through the first passage 48.

The plunger 40 may be a screw type plunger having an end with a needle 62. The needle 62 may cooperate with the insert 60a to meter the flow from the second passage 50 to the first passage 48 when the plunger 40 adjusted longitudinally by an adjustment screw similar to the cam and knob discussed above.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A shock absorber comprising:

a shock absorber body defining a cavity at least partially filled with a fluid;

a piston slideably disposed within said body separating said cavity into first rebound and second compression fluid chambers;

a rod secured to said piston and including first and second portions respectively adjacent to said first and second chambers with a fluid passageway extending between said first and second portions fluidly connecting said first and second chambers, said passageway including a first passage extending longitudinally from said first portion and a second passage extending from said second portion transverse to said first portion, and said rod including a longitudinal bore having an adjustable plunger with an end disposed therein with said end proximate to an intersection of said first and second passages movable to block at least a portion of said passageway to control the flow of said fluid through said passageway; and a valve assembly including a one-way spherical ball cheek valve disposed within said passageway for controlling the flow of said fluid between said first and second chambers through said passageway.

2. The shock absorber according to claim 1, wherein said first chamber is a rebound chamber and said second chamber is a compression chamber with said one-way valve arranged to prevent flow of said fluid from said rebound chamber to said compression chamber and permit flow of said fluid from said compression chamber to said rebound chamber.

3. The shock absorber according to claim 1, wherein said one-way valve is arranged to prevent flow of said fluid from said compression chamber to said rebound chamber and permit flow of said fluid from said rebound chamber to said compression chamber.

4. The shock absorber according to claim 1, further including a second piston slidably disposed within said body separating said second chamber from a gas chamber in said cavity.

5. The shock absorber according to claim 1, wherein said first passage is generally coaxial with said plunger.

6. The shock absorber according to claim 5, wherein said check valve is disposed within said first passage.

7. The shock absorber according to claim 1, wherein said check valve is axially spaced from said plunger end.

8. The shock absorber according to claim 1, wherein said first and second passages are generally normal to one another.

\* \* \* \* \*

UNITED STATES PATENT AND TRADEMARK OFFICE
CERTIFICATE OF CORRECTION

PATENT NO.    : 6,659,239 B2
DATED         : December 9, 2003
INVENTOR(S)   : Van Wonderen et al.

It is certified that error appears in the above-identified patent and that said Letters Patent is hereby corrected as shown below:

<u>Column 4,</u>
Line 39, please change "cheek" to -- check --

Signed and Sealed this

Third Day of February, 2004

JON W. DUDAS
*Acting Director of the United States Patent and Trademark Office*